(12) United States Patent
Bresch et al.

(10) Patent No.: US 7,340,346 B2
(45) Date of Patent: *Mar. 4, 2008

(54) METHOD FOR GENERATING DATA SET

(75) Inventors: David N. Bresch, Birmensdorf (CH); Pamela Heck, Zurich (CH); Gerry Lemcke, Rye, NY (US)

(73) Assignee: Swiss Reinsurance Company, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/598,524

(22) Filed: Nov. 13, 2006

(65) Prior Publication Data

US 2007/0093964 A1    Apr. 26, 2007

Related U.S. Application Data

(63) Continuation of application No. 10/787,791, filed on Feb. 26, 2004.

(51) Int. Cl.
*G06T 15/00* (2006.01)

(52) U.S. Cl. .............................. 702/2; 702/3; 345/419; 345/420; 345/619; 345/629; 342/357.13; 342/357.06

(58) Field of Classification Search ................. 702/2–3
See application file for complete search history.

(56) References Cited

U.S. PATENT DOCUMENTS

| 6,076,044 A * | 6/2000 | Brown ........................... 702/3 |
| 6,493,633 B2 * | 12/2002 | Baron et al. .................... 702/3 |
| 2003/0061015 A1 * | 3/2003 | Ben-Gal et al. ............... 703/2 |

* cited by examiner

*Primary Examiner*—Bryan Bui
*Assistant Examiner*—Sujoy Kundu
(74) *Attorney, Agent, or Firm*—Barnes & Thornburg LLP

(57) ABSTRACT

A computer method of generating a probabilistic dataset relating to a weather event includes inputting data representative of an historical weather event, and generating data representative of a plurality of alternative events. The data for the alternative events are generated, in certain embodiments, by a dependent sampling process. In particular embodiments, the dependent sampling process is a directed random walk process. Data for the alternative events may include data relating to the geographical positions or "tracks" of the event, data relating to atmospheric pressures, or both.

13 Claims, 11 Drawing Sheets
(4 of 11 Drawing Sheet(s) Filed in Color)

METHOD FOR GENERATING DATA SET

CROSS-REFERENCE TO RELATED APPLICATION

The present application is a continuation of U.S. patent application Ser. No. 10/787,791, filed on Feb. 26, 2004, and claims priority thereto. The subject matter disclosed in this utility application is hereby expressly incorporated into the present application.

FIELD OF THE INVENTION

The present invention relates generally to methods of generating data sets and, more particularly, computer methods for generating data sets relating to weather events.

BACKGROUND AND SUMMARY

Each year, tropical cyclones (also referred to as hurricanes, typhoons and tropical storms) cause severe damage in various parts of the world. The occurrence of such weather events is difficult, if not impossible, to predict over the long term. Even the path, or track, of an existing storm can be difficult to predict over a period of hours or days.

Nevertheless, insurance companies and other entities need to develop ways of assessing the risks associated with such weather events, and factoring that knowledge into the pricing of insurance products and the magnitudes and frequencies of damages to expect over time. Information is available for use in this regard in the form of historical data on storms which have occurred through the years. Approximately 80 such storms occur worldwide each year. Data are collected on many of these storms, including positional data for the storm path or "track," wind speeds, barometric pressures, and other factors. Such storms are best documented in the North Atlantic (i.e., the portion of the Atlantic Ocean north of the equator), where reliable data for more than 100 years of activity are available. Approximately 10 storms occur in the North Atlantic region on an annual basis. Historical data are also available for cyclones occurring in the Northwest Pacific, where approximately 26 storms occur each year. Suitable data for these Pacific storms are available only for the last approximately 50 years. Less data are available for storms in other regions.

Using all available historical data, information relating to a few hundred storms are available for review by researchers and scientists. Such information is useful in assessing risks associated with storm damages in the subject areas. However, given the unpredictable nature of storm behavior, and the number of factors influencing such behaviors, the available data set of historical storms is relatively small from a probabilistic viewpoint. Given that this data set will grow by only a relatively few storms per year, a problem exists with regard to performing statistical analysis relating to the possibility of a storm occurring at a particular location.

One manner in which this problem can be addressed is by generation of simulated or "alternative" storms, and using data from such "storms" to expand the data set available from historical records. This approach can result in the availability of thousands, or even tens or hundreds of thousands, of additional storms from which to create data sets large enough to perform reliable statistical analyses. The subject invention is directed to various embodiments involving uses of computer methods for generating such expanded probabilistic data sets.

One embodiment of the invention comprises a computer method for generating a probabilistic data set relating to a weather event, such as a tropical cyclone, or hurricane, typhoon, or tropical storm. This embodiment of the method includes the steps of inputting data representative of an historical track of a weather event and generating data representative of a plurality of alternative tracks based on the historical track. The data points representative of the alternative tracks are generated from respective points along the historical track by a dependent sampling process. In certain embodiments, the dependent sampling process is a directed random walk process.

In one embodiment, the step of generating data representative of alternative tracks based on the historical track comprises the steps of generating a series of random tuples $(x_r, y_r)$ for a historical point $(x,y)$ of the historical track, calculating a sum of random deviations $(x',y')$ of the random tuples along the historical track, and adding the sum of random deviations $(x',y')$ to the historical point $(x,y)$ of the historical track to produce alternative points along the alternative tracks.

The data representative of the historical track(s) include a plurality of points representative of geographical positions along the historical track(s). The generated data representative of a plurality of alternative tracks includes a plurality of alternative points representative of geographical positions along the alternative tracks. In one embodiment, at least some of the plurality of alternative tracks associated with a particular historical track have starting points that differ from a starting point of the historical track upon which the alternative tracks are based. The data representative of the historical track may comprise longitude and latitude data to define a location of each of a plurality of points.

In certain embodiments of the method, the step of inputting data representative of an historical track includes the step of inputting at least one of: longitude and latitude of a plurality of points representative of the historical track; an azimuth angle for at least some of the points along the historical track; celerity for at least some of the points along the historical track; a rate of change of azimuth angle for at least some of the points along the historical track; and a rate of change of celerity for at least some of the points along the historical track. Alternatively, the latter values (azimuth, celerity, and rates of change of azimuth and celerity) may be calculated from longitude and latitude data recorded at periodic time intervals.

Some embodiments of the subject method further comprise the step of selecting a subset of the data representative of the alternative tracks for use in the probabilistic data set. In these or other embodiments, the step of generating data representative of alternative tracks includes the step of limiting a variance of the alternative points from a respective historical point in accordance with one or more physical laws.

In certain embodiments of the subject method, the step of inputting data representative of a track of an historical weather event includes inputting data representative of an intensity of the event. The data representative of intensity may comprise atmospheric pressure data associated with at least some of the plurality of points along the historical track. The atmospheric pressure data defines an historical pressure profile of the historical track. The atmospheric pressure data may include an absolute pressure and a derivative of (or change in) absolute pressure with respect to time. In certain embodiments, the atmospheric pressure data includes one or more pressure distributions. In some embodiments of the subject method, the step of inputting data includes inputting data representative of a plurality of historical tracks, and the step of establishing a grid over a geographical area of interest including at least a portion of the plurality of tracks. These embodiments may further comprise the step of establishing a pressure climatology for selected cells in the grid, based upon the atmospheric pressure data associated with at least some of the plurality of points along the historical tracks located within the selected grid cells. The pressure climatology for the selected cells may be a pressure distribution function. The pressure climatology for a selected cell in the grid may be established from the atmospheric data associated with the selected cell and/or the atmospheric pressure data associated with one or more cells adjacent the selected cell (i.e., one or more neighboring cell). In certain embodiments, the pressure climatology for a selected cell is established from a weighted averaging of pressure data associated with the selected cell and pressure data associated with one or more neighboring cell.

In certain embodiments, each cell in the grid is assigned a land/sea value. In these embodiments, pressure data associated with an adjacent cell is used to establish the pressure climatology of the selected cell only if the adjacent and the selected cell have the same land/sea value.

Certain embodiments of the subject method comprise the additional step of generating one or more alternative pressure profiles for one or more of the historical tracks using the pressure climatology for the selected cells in the grid. In addition, one or more pressure profiles may be generated for one or more of the alternative tracks. One or more alternative pressure profiles may also be generated for one or more of the alternative tracks using the pressure climatology for the selected cells of the grid. In some embodiments, at least one of the alternative pressure profiles for the historical tracks, the pressure profiles for the alternative tracks, and the alternative pressure profiles for the alternative tracks are modified based, at least in part, on the historical pressure profile along the historical track of the associated weather event.

In certain embodiments of the invention, the step of inputting data includes inputting data representative of a plurality of historical tracks and inputting data representative of atmospheric pressure associated with at least some of the plurality of points along the historical tracks. The atmospheric data defines historical pressure profiles of the historical tracks. In these embodiments, the step of generating data includes generating a plurality of alternative tracks for more than one of the historical tracks. Further, these embodiments include at least one of the following steps: a) generating one or more alternative pressure profiles for one or more of the historical tracks; b) generating one or more pressure profiles for one or more of the alternative tracks; and c) generating one or more alternative pressure profiles for one or more of the alternative tracks. These or other embodiments of the subject method may further comprise the step of extracting a subset of data from the data representative of the historical tracks, the alternative tracks, and the pressure profiles, based on climatological conditions for a selected time period.

Additional features and advantages will become apparent to those skilled in the art upon consideration of the following detailed description of illustrative embodiments exemplifying the best mode of carrying out the method as presently perceived.

BRIEF DESCRIPTION OF DRAWINGS

The patent or application file contains at least one drawing executed in color. Copies of this patent or patent application publication with color drawing(s) will be provided by the Office upon request and payment of the necessary fee.

The present disclosure will be described hereafter with reference to the attached drawings which are given as non-limiting examples only, in which.

DETAILED DESCRIPTION OF THE DRAWINGS

Figure 1:
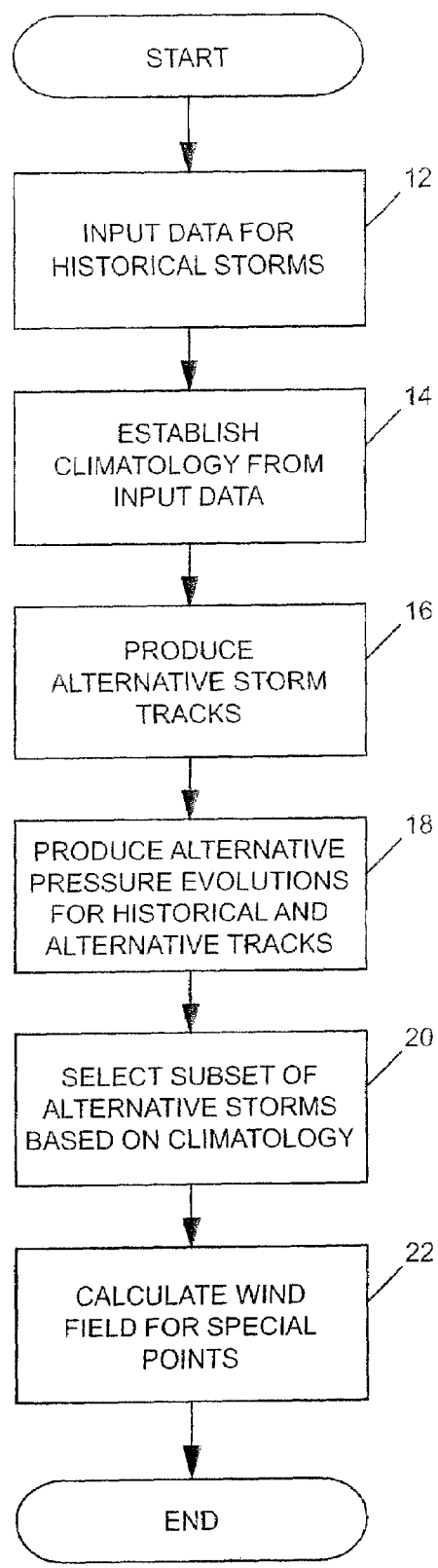
FIG. 1 is a flow chart which illustrates the overall operation of one embodiment of the method of the present invention.

FIG. 1 is a flow chart which illustrates the overall operation of one embodiment of the subject method. The first step in this embodiment is inputting data for a plurality of historical storms. This step is represented by block 12 of FIG. 1. Such data includes geographical information defining the tracks of the respective historical storms and intensity data to indicate the strength of the storm. One source of such data is the National Hurricane Center ("NHC") which is part of the National Oceanic and Atmospheric Administration ("NOAA"). Geographic and intensity data for hurricanes and tropical cyclones and storms may be viewed at, and is available from, the NHC website at www.nhc-.noaa.gov. Following the inputting of this data, a climatology is established in the area of interest. This operation is represented by block 14 in FIG. 1. After establishment of the climatology, alternative storm tracks are produced for each of the historical tracks in the inputted data. This step is represented by block 16.

Following production of the alternative storm tracks, a plurality of alternative pressure evolutions are produced for the historical and alternative tracks. This step is represented in FIG. 1 by block 18. Production of the alternative storm tracks, and the alternative pressure evolutions for the historical and alternative tracks, creates a relatively large universe of storms (both historical and alternative). A subset of the alternative storms is selected based on climatological data. This step is represented by block 20. Finally, wind fields are calculated for specific points of interest. This step is represented in the flow chart of FIG. 1 by block 22. Each of steps 12-22 are discussed in additional detail below in connection with the flow charts of FIGS. 2-6.

Figure 2:
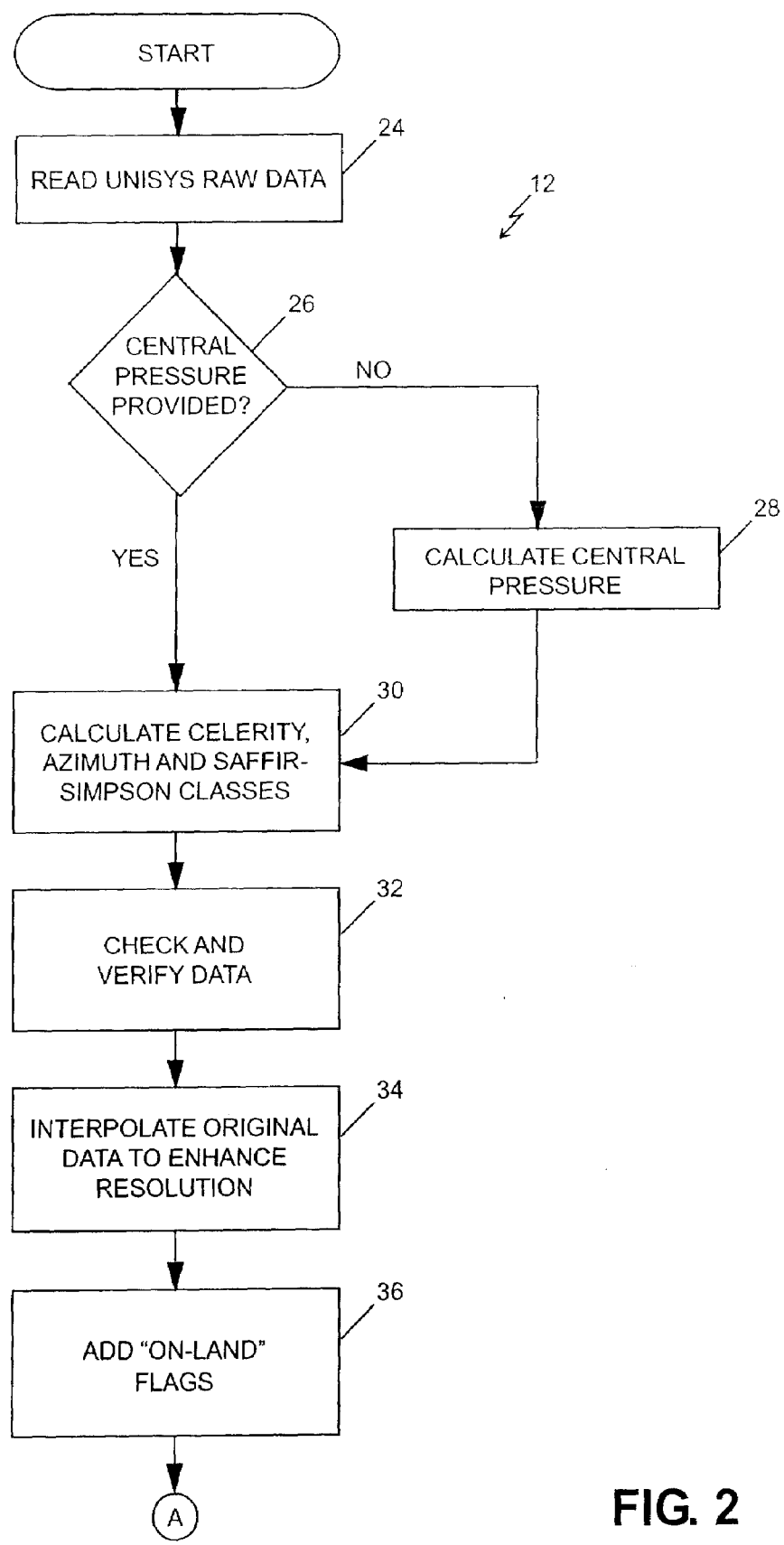
FIG. 2 is a flow chart which further illustrates the step of inputting data for historical storms in the embodiment of FIG. 1.

FIG. 2 is a flow chart which further illustrates the step of inputting data for historical storms in the embodiment of FIG. 1. The first operation in this step is represented by block 24 labeled "Read Raw Data." As previously indicated, one source of data on historical storms is the National Hurricane Center. These data include geographical (i.e., latitude and longitude) data which define individual nodes of the historical track. The locations of storms are generally reported at six hour time intervals. In many instances, intensity data is also provided in the form of a pressure measurement taken in the vicinity of the center of the node. In the event a central pressure measurement is not provided, a pressure may be calculated from the maximum sustained wind also available on the site. These operations are represented by decision block 26 and processing block 28.

After reading the raw data and, if necessary, calculating pressures, additional calculations are performed to determine celerity, azimuth angles and Saffir-Simpson classes. These calculations are represented in the flow chart of FIG. 2 by block 30. At this point, the data are checked and verified (block 32). After those operations, the original data may be interpolated to enhance resolution. That is, additional geographical points or nodes may be defined between the "six hour nodes" available in the raw data. The six hour nodes are interpolated to allow for a better geographical resolution. In one embodiment, the data are interpolated to 0.2 degree steps. Such interpolation allows for the generation of smoother, alternative storm tracks, and enhances the overall operation of the subject method. This operation is represented by block 34 of FIG. 2.

The last operation in the step of inputting historical data relates to the addition of "on-land" flags. When a storm moves from a position over water to a position over land (or vice versa), substantial pressure changes are observed. Accordingly, and fall and land leave points are determined and entered into the data for use in subsequent steps of the process. This operation is represented in the embodiment of FIG. 2 by block 36.

Figure 3:
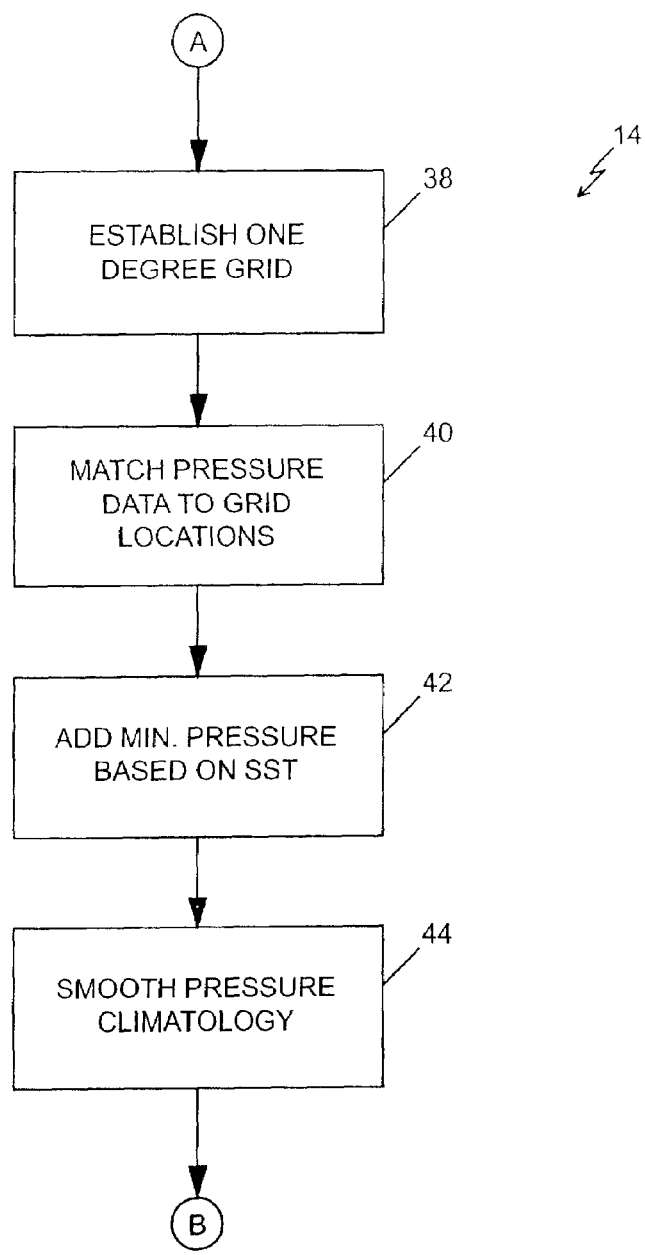
FIG. 3 is a flow chart which further illustrates the step of establishing a climatology in the embodiment of FIG. 1.

FIG. 3 is a flow chart which further illustrates the step of establishing a climatology in the embodiment of FIG. 1. Even though records of more than 100 years of reliable pressure data exist, this historical data is preferably preprocessed in order to obtain a more consistent database by the methods described herein. The first operation in the step of establishing a pressure climatology is establishment of a 1° by 1° grid over the geographical area of interest. This operation is represented by step 38 in the embodiment of FIG. 3. The original data includes both the absolute pressure at specified locations, and the change in pressure (i.e., the pressure derivative). These data are matched with the individual grid locations (block 40). Some locations in the grid will have many observed pressure and pressure derivative values. Other locations have fewer observed values, and yet others may have none.

Following this operation, minimum pressures based on the sea surface temperature (SST) climatology are added. That is, for each location in the grid, the lowest pressure associated with the highest SST ever observed in that particular location is entered. This value acts as a "floor" for alternative pressure values associated with each location in the grid that may be selected (as discussed in additional detail below) in connection with alternative pressure evolutions for the historical and/or alternative storm tracks. This operation is represented by block 42 in the embodiment of FIG. 3.

After addition of minimum pressures, the pressure climatology is smoothed. The goals of the smoothing process include one or more of the following: to obtain full coverage of the area of interest; to smooth variations in the distributions of pressures and pressure derivatives from one grid to its neighboring grids; to smooth variations in distributions of minimums, maximums and means of the absolute pressures and pressure derivatives; and to obtain the same number of "observations" at each grid location. This smoothing process leads to a more consistent set of pressure related values for the area of interest to be used in a sampling process to be described further below. In the particular embodiment being described, the quantities to be smoothed are not scaler quantities (such as, a mean pressure quantity at each location), but rather are pressure-related distributions for each location. Accordingly, the smoothing process is relatively more complex.

In order to achieve the goals stated above, one embodiment of the subject method follows the approach set forth below. Other approaches may be used, and some may very well be comparable to, or even preferred over, this approach. The approach is as follows:

The number of valid observations at each location is determined. In this embodiment, up to 260 observations for each location may be entered. Some locations may have this many observations (or more) while other locations may have fewer or none. All non-valid data are replaced. The distinction between valid observations and non-valid observations is based upon the fact that pressure values below 800 hPa are impossible, and thus not valid. After all valid observations are entered for each location, the subject method loops through the data location, applying the following procedure at each location (referred to as the "center location"):

1) Obtain all valid observations for the center location and all neighboring locations (i.e., all grid cells surrounding the "center" cell) having the same land/sea value. That is, if the center location is a sea location, only neighboring locations that are also sea locations are considered. If the center location is a land location, only neighboring locations that are also land locations are considered. Thus, and and sea observations are not mixed in the smoothing process.

2) Construct the pressure distribution file for all points. The center location observations are more heavily weighted, for example, by counting them twice. Depending on the number of neighboring locations having the same land/sea values and the number of valid observations at each location, an arbitrary number of observations for this particular pressure distribution file is obtained.

3) Use a cubic spline to interpolate the pressure distribution function to a standard number of observations (for example, 1000 observations for each location).

The above approach will produce a data set having a standard number (for example, 100) of pressure and pressure derivative observations at each grid cell which is not separated by more than 1 degree from an original cell. By iteration, one can in theory fill all gaps existing in the area of interest.

The above-described approach accomplishes the goals set forth previously. Locations in which historical observations are not available within the area of interest are "filled in," and variations across the area of interest are smoothed. However, sharp pressure gradients which occur at land/sea transition locations are maintained.

The pressure climatology smoothing operation is represented in FIG. 3 by block 44. It should be noted that, in the described embodiment, both a land climatology and a sea climatology are established and smoothed in the manner described above.

Figure 4:
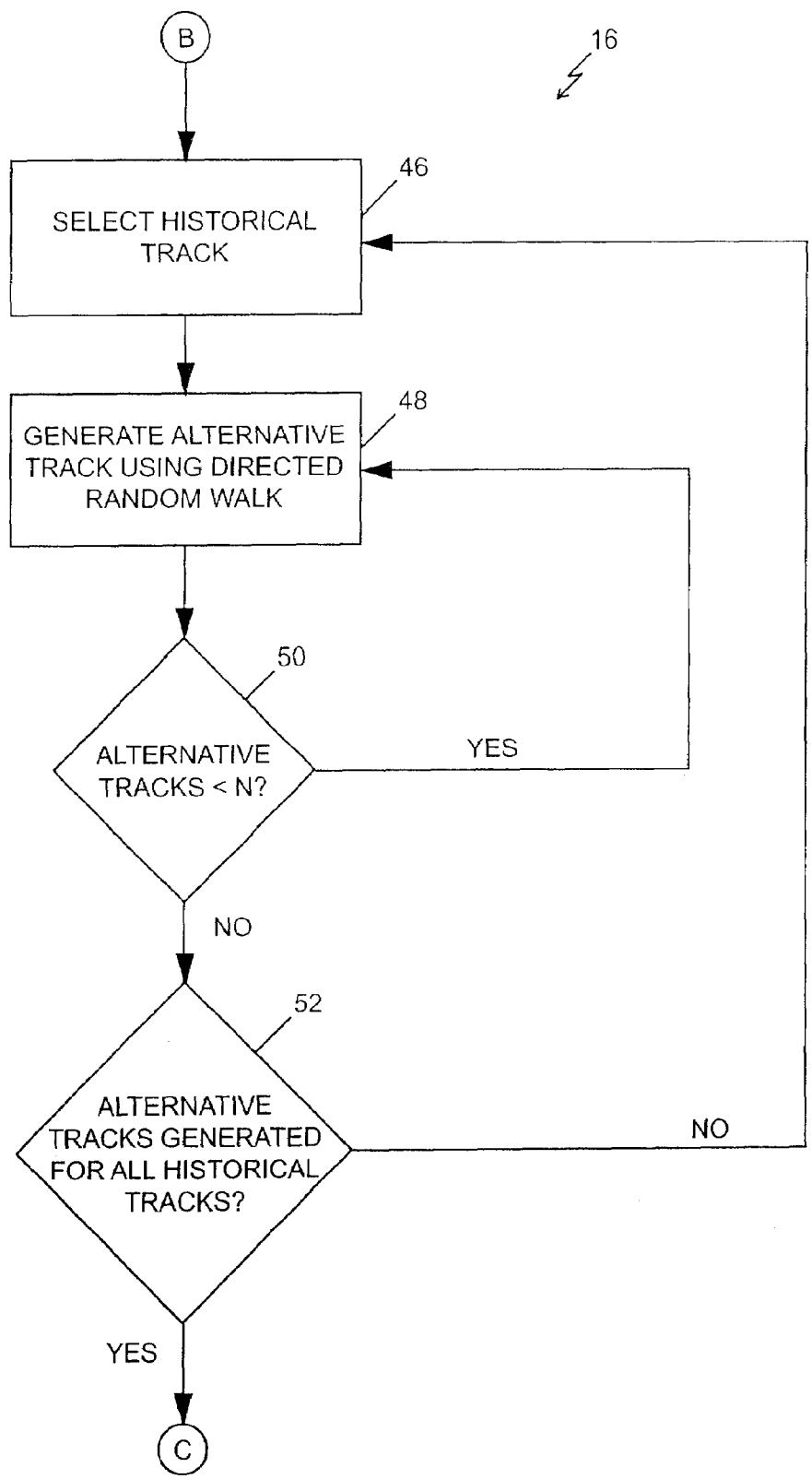
FIG. 4 is a flow chart which further illustrates the step of producing alternative storm tracks in the embodiment of FIG. 1.

FIG. 4 is a flow chart which further illustrates the step of producing alternative storm tracks in the embodiment of FIG. 1. The first step in this operation is selection of one of the plurality of historical tracks (i.e., longitude and latitude data) inputted in the first step of the overall process illustrated in FIG. 1. The selection operation is represented in the flow chart of FIG. 4 by block 46. An alternative track is then generated for the selected historical track. The specific manner in which each alternative track is generated is described in additional detail below. This operation is represented in the flow chart of FIG. 4 by block 48. A plurality (N) of alternative tracks are produced. In the embodiment of FIG. 4 this is illustrated by the presence of decision block 50 and the resulting loop. Similarly, a plurality of tracks are generated for each historical track. This aspect of the operation is illustrated by the presence of decision block 52 and the resulting loop.

Figure 5:
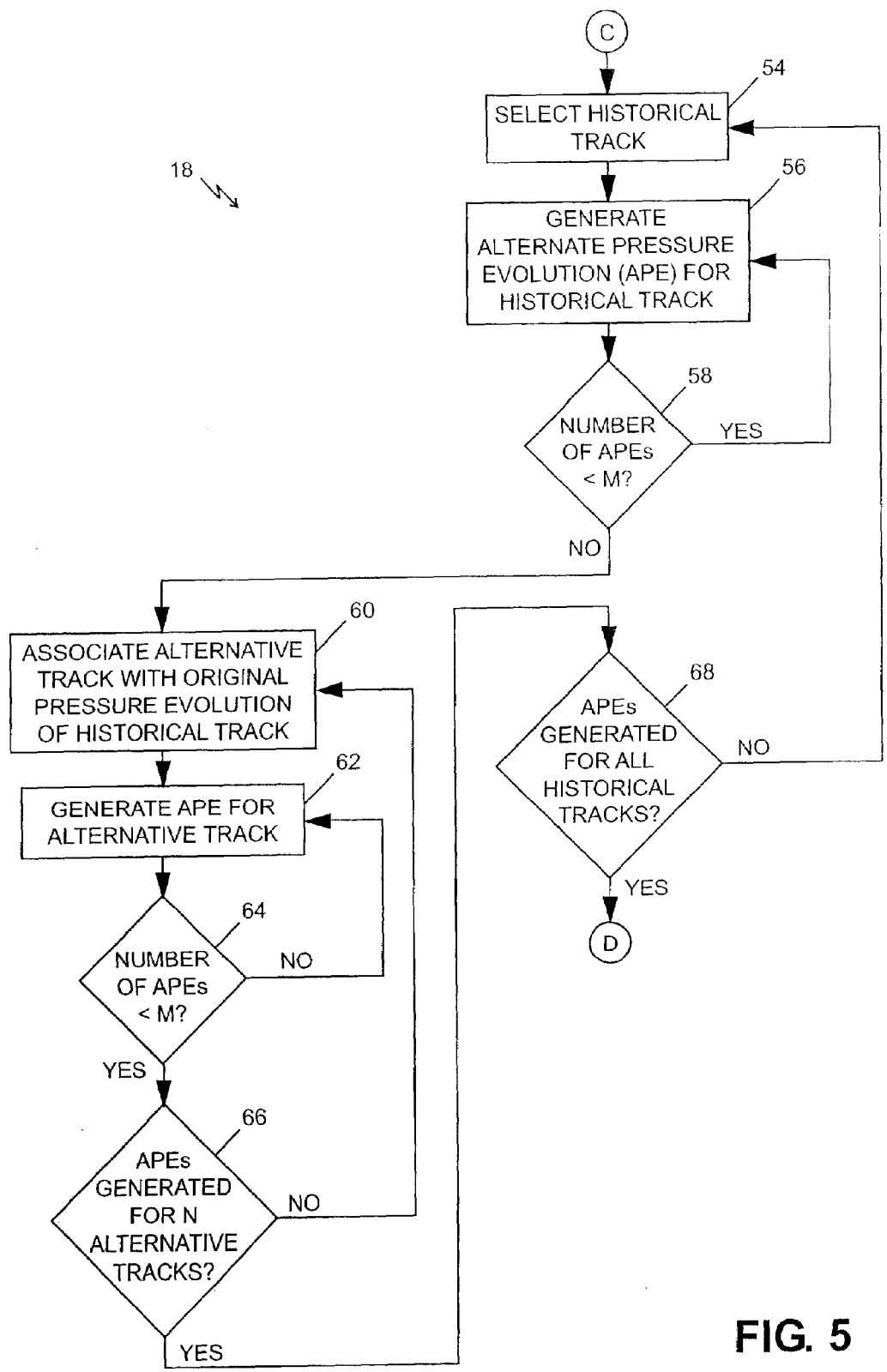
FIG. 5 is a flow chart which further illustrates the step of producing alternative pressure evolutions in the embodiment of FIG. 1.

Following generation of the alternative tracks, the embodiment of the method illustrated in FIG. 1 produces an alternative pressure evolution ("APE") for each of the historical tracks and the alternative tracks. FIG. 5 is a flow chart which further illustrates the step of producing APEs in the embodiment of FIG. 1. The first operation in this step is selection of an historical track. This operation is represented in FIG. 5 by block 54. The next operation in this step is generation of an APE for a selected historical track. This operation is represented in FIG. 5 by block 56. A plurality (M) of APEs are generated. This feature is represented schematically by decision block 58, and the resulting loop.

In addition to generating an APE for each historical track, it is desirable to generate an APE for each alternative track associated with each historical track. Accordingly, after generation of an APE for the first historical track, the method of this embodiment associates each alternative track generated from the selected historical track with the original pressure evolution of the historical track. This operation is represented in FIG. 5 by block 60. An APE is then generated for the alternative track (block 62). The methodology for generating the APE is the same as was used in connection with the operation referred to in connection with block 56. A specific sampling process applicable to this operation is discussed in additional detail below. A plurality (M) of APEs are generated for each alternative track. This feature is illustrated in FIG. 5 by decision block 64, and the resulting loop. APEs are then similarly generated for each of the plurality (N) of alternative tracks associated with each historical track. This feature is illustrated by decision block 66 in FIG. 5, and the resulting loop. Finally, the operation continues in this manner until APEs have been generated for all historical tracks and all associated alternative tracks. This feature is illustrated in the embodiment of FIG. 5 by decision block 68, and the resulting loop.

Figure 6:
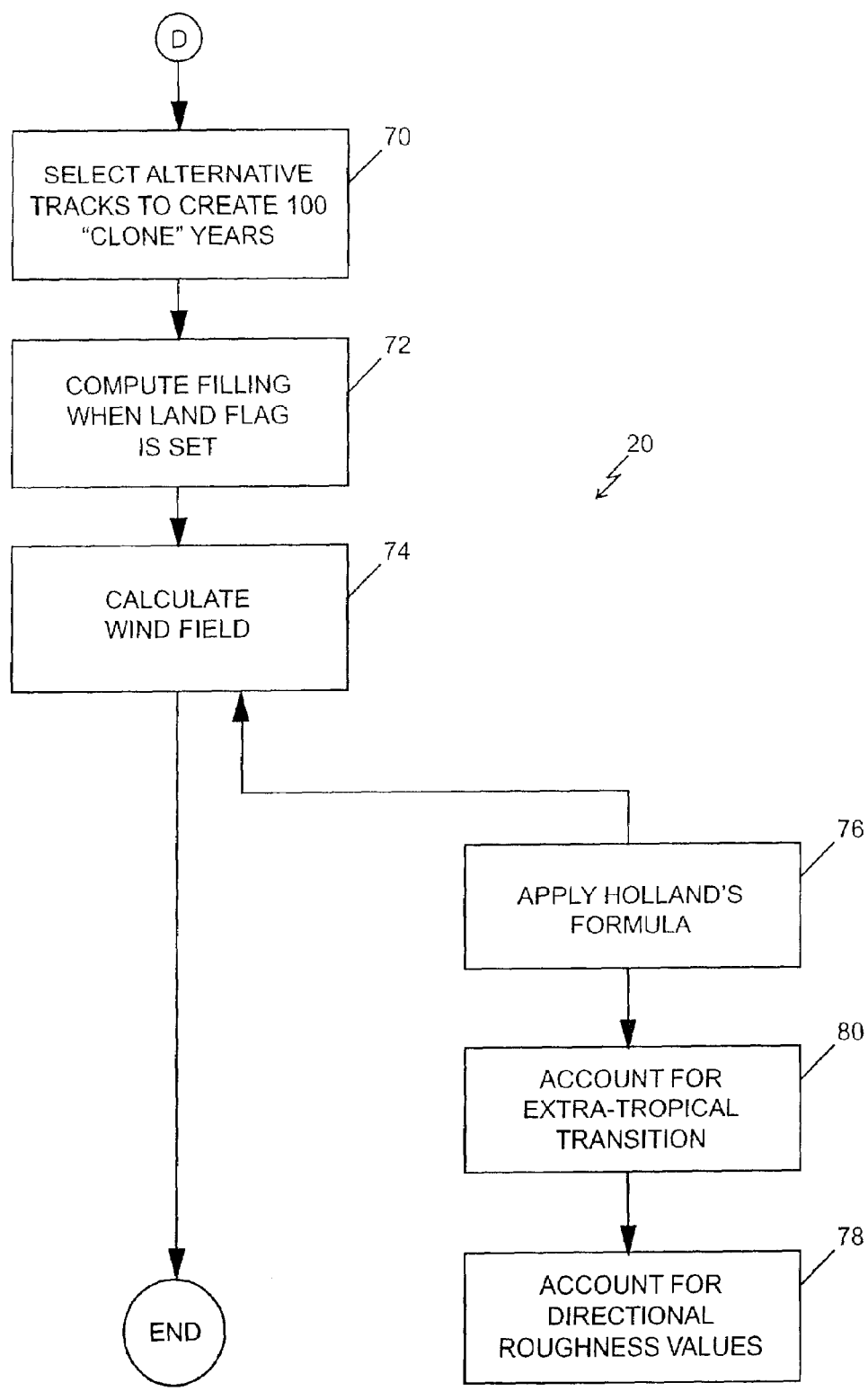
FIG. 6 is a flow chart which further illustrates the steps of selecting a subset of alternative storms and calculating the wind field in the embodiment of FIG. 1.

FIG. 6 is a flow chart which further illustrates the steps of selecting a subset of alternative storms based on climatology in the embodiment of FIG. 1. The first operation in this step is selection of alternative tracks to create a plurality of "clone" years. Specifically, each historical year includes a plurality of historical storms. In accordance with the above discussion, a plurality (N) of alternative tracks are created for each historical track in a given year. However, since the alternative tracks are produced by a random process (albeit one that uses a dependent sampling technique), some of the alternative tracks for a given year are more likely to occur than others. The selection process is based upon knowledge of the climatology for the actual year in which the associated historical storm tracks occurred. In other words, alternative tracks which might be judged as relatively unlikely to occur in actuality are deselected, based on established climatological knowledge. Thus, from the universe of alternative tracks available to create a "clone" year, a selection is made to include certain of the alternative tracks and exclude others. This operation is illustrated by block 70 in FIG. 6.

An "adjustment" made to the data for the selected storms relates to the previously discussed "on-land" flags. Since pressures increase rapidly when a storm moves from over water to over land, pressure data associated with the alternative tracks are adjusted to reflect this phenomena. This operation is represented by block 72 in the flow chart of FIG. 6.

The final step in the overall methodology illustrated by the flow chart of FIG. 1 relates to calculation of the wind field for particular points along each storm path. Such calculations include application of Holland's Formula, accounting for extra-tropical transitions, and accounting for directional roughness values. These operations are represented by blocks 74, 76, 78, and 80 in the flow chart of FIG. 6.

Figure 7:
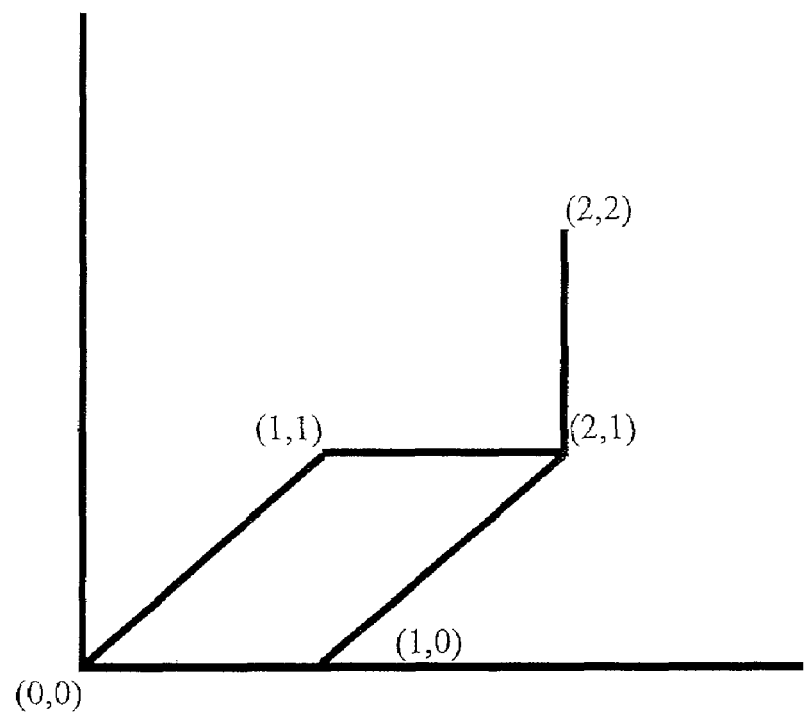
FIG. 7 illustrates a method of generating points of a probablistic data set which are representative of a portion of an alternative storm track.

As previously noted, the alternative storm tracks are generated by a dependent sampling technique. FIG. 7 illustrates a method of generating points of a probabilistic data set which are representative of an alternative storm track. With reference to FIG. 7, line segment 100 represents a portion of an historical storm track. For purposes of discussion, an x-y coordinate system has been superimposed such that line 100 may be represented by three points, as follows:

$$x = 0 \quad 1 \quad 2$$
$$y = 0 \quad 1 \quad 1$$

Corresponding points of an alternative track, represented by line 102, are produced by generating a series of random tuples $(x_r, y_r)$ for each point of the historical track, then calculating the cumulative sum $(x', y')$ of these random numbers along the track (i.e., summing up random deviations along the track), and then adding these accumulated random deviations $(x', y')$ to the historical track $(x, y)$. The resulting points define the alternative track. In the example of FIG. 7, the random tuples are:

$$x_r = 1 \quad 0 \quad -1$$
$$y_r = 0 \quad 0 \quad 1$$

The cumulative sums along the alternative track are:

$$x' = 1 \quad 1 + 0 = 1 \quad 1 + (-1) = 0$$
$$y' = 0 \quad 0 + 0 = 0 \quad 0 + 1 = 1$$

Finally, the points on the generated track (line 102) are obtained as follows:

$$x + x' = 0 + 1 = 1 \quad 1 + 1 = 2 \quad 2 + 0 = 2$$
$$y + y' = 0 + 0 = 0 \quad 1 + 0 = 1 \quad 1 + 1 = 2$$

There are different ways to generate the random numbers, either by independently sampling from a normal or uniform distribution, or by a dependent sampling technique (such as, a directed random walk). Using the latter, a subsequent point can only deviate to a certain degree from a previous point. As will be illustrated in additional detail below, a dependent sampling technique (particularly, a directed random walk) generates more realistic alternative storm tracks.

Figure 8A:
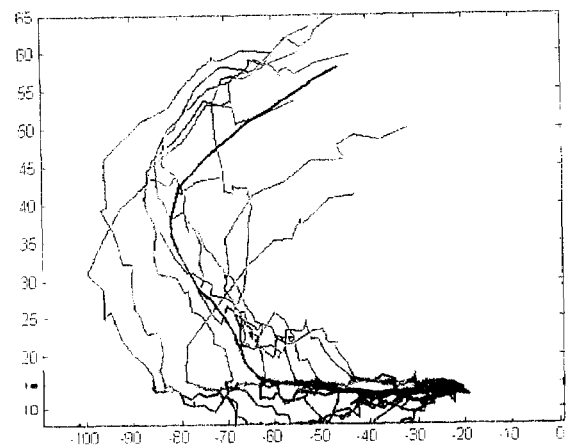
FIG. 8a illustrates a plurality of alternative storm tracks generated by the method of FIG. 7 using a normally-distributed random walk.
Figure 8B:
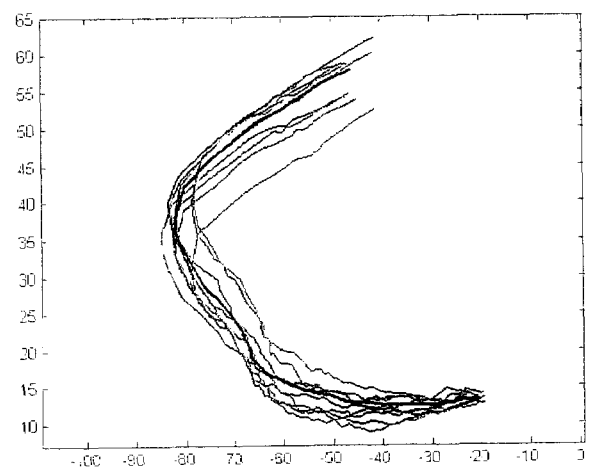
FIG. 8b illustrates a plurality of alternative storm tracks generated by the method of FIG. 7 using an evenly-distributed random walk.
Figure 8C:
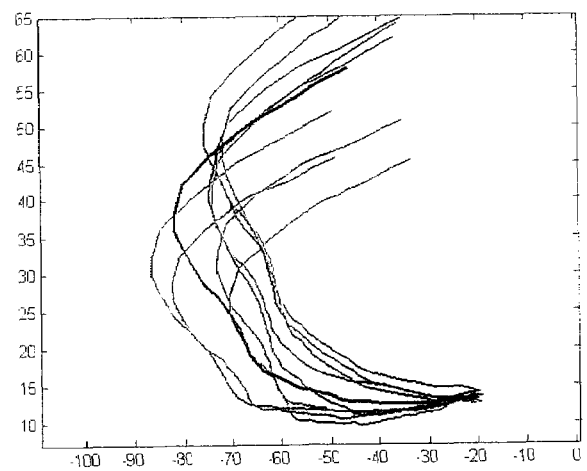
FIG. 8c illustrates a plurality of alternative storm tracks generated by the method of FIG. 7 using a directed random walk.

FIGS. 8a- 8c illustrate alternative storm tracks generated by the above-described technique, using both independent and dependent sampling. FIG. 8a illustrates the results achieved when the random numbers are generated by independent sampling from a normal distribution. In FIG. 8a, heavy line 104 represents the historical track. The remaining lines represent alternative tracks. The alternative tracks illustrate erratic storm movements which are not likely to occur in nature.

FIG. 8b shows historical track 104 and a plurality of alternative tracks generated by an independent sampling technique wherein the random numbers are generated from a uniform distribution. The alternative tracks in this example are much smoother than those illustrated in FIG. 8a. However, the alternative tracks in FIG. 8b continue to exhibit unrealistic "movements" at numerous points along the track.

FIG. 8c shows historical track 104 and a plurality of alternative tracks generated by a dependent sampling technique. In FIG. 8c, each point along an alternative track can only deviate to a certain degree from the previous point. As the results illustrate, this "directed random walk" generates alternative tracks which are more realistic than those illustrated in FIGS. 8a and 8b.

Figure 9A:
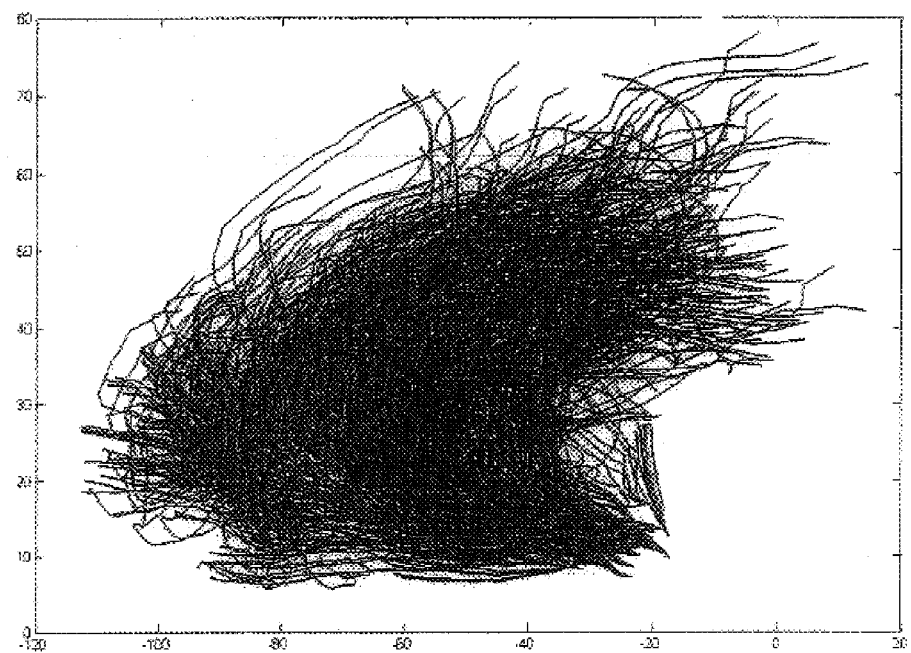
FIG. 9a illustrates a plurality of alternative storm tracks, each originating at the starting point of a respective historical track.
Figure 9B:
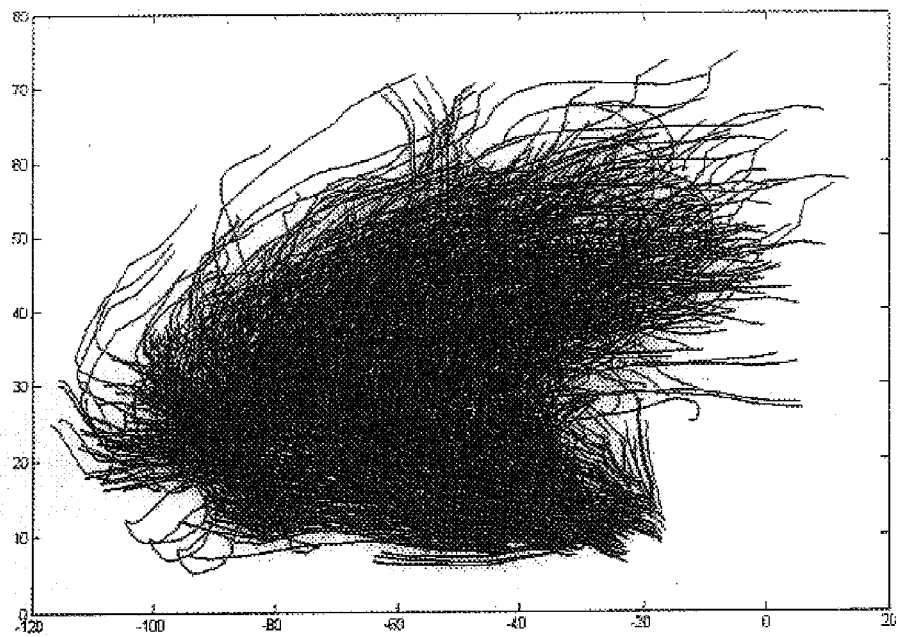
FIG. 9b illustrates a plurality of alternative storm tracks, each originating at an alternative starting point relative to a respective historical track.

FIG. 9a illustrates the results produced when a plurality of alternative tracks are generated from each of a relatively larger number of historical tracks. In the illustration of FIG. 9a, each historical track, and its respective associated alternative tracks, begins at a common point (see, for example, the tracks beginning in the lower right portion of FIG. 9a). FIG. 9b illustrates a similar number of tracks, but incorporates a refinement that is an aspect of the present invention. The refinement involves selecting alternative starting points for each of the plurality of alternative tracks associated with a particular historical track. The effects of this change are readily apparent by the differences in the lower right portions of FIG. 9a and FIG. 9b, respectively. This change alleviates somewhat an unnatural "clustering" of alternative and historical tracks which is apparent in the illustration of FIG. 9a.

Figure 10:
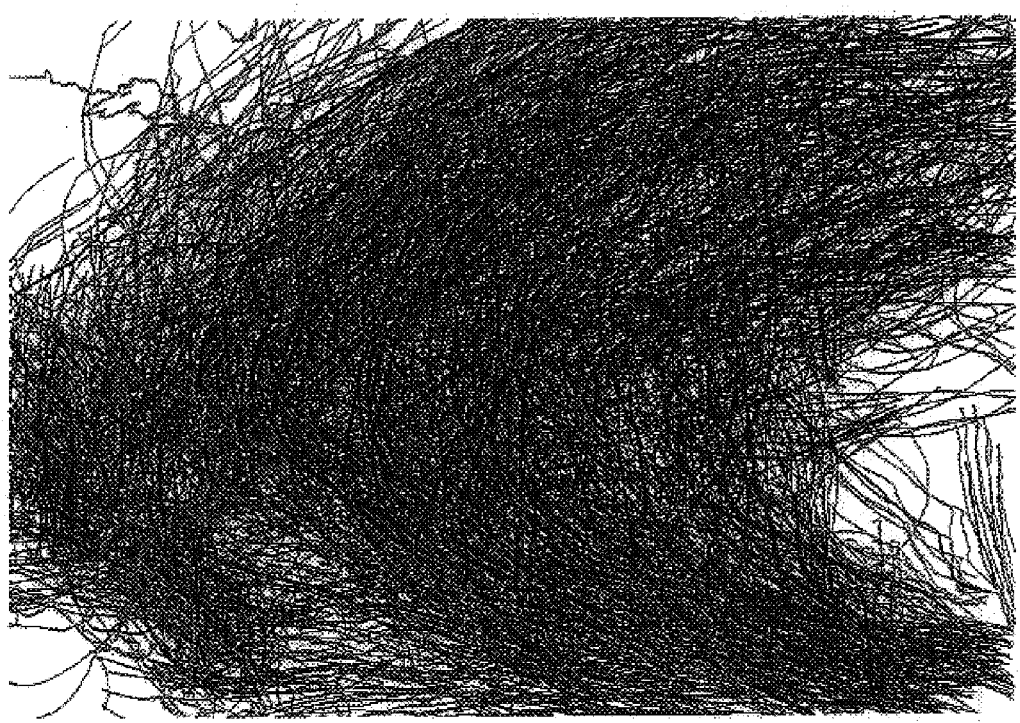
FIG. 10 illustrates a plurality of historical and alternative storm tracks superimposed over a portion of a map.

FIG. 10 illustrates the result which is obtained when a relatively large number of historical tracks, and a plurality of alternative tracks associated with each historical track, are superimposed upon a map of the Caribbean and North Atlantic.

The sampling process by which the alternative pressure evolutions (APEs) are produced will now be described. As discussed above in connection with FIG. 3, a pressure climatology is established and smoothed. Subsequent to these steps, an historical storm is selected for sampling. At each location, the historical pressure is first noted. Then, an alternative pressure value is selected from the pressure distributions available for that location from the smoothed pressure climatology. The chosen pressure is then associated with that geographical point of the historical track to produce an alternative pressure evolution for that point. This process is repeated to create a plurality (M) of alternative pressure values for each point, and thus a plurality of alternative pressure evolutions for the historical track.

One manner of producing an alternative pressure evolution for a selected track may be referred to as the "minimum" method. In this method, the location (latitude and longitude) of the absolute pressure minimum in the selected track is identified. A new pressure value is then selected according to a pressure distribution function at that location. The selection may be based on a random choice. Once the new minimum value is chosen, all other pressure values along the selected track are adjusted accordingly, leaving only the first and last values unchanged. This results in an alternative pressure evolution which mirrors the shape of the selected track, but in which the absolute values of the pressures will vary at each location (except for the very first and very last locations along the track). Landfall and landleave locations may also be identified to assure that appropriate values are set in the alternative pressure evolutions at these locations.

Another method by which alternative pressure evolutions may be generated can be described as the "percentile" method. This method is based on pressure differences over time (dp/dt), along with information from the historical track. The steps for computing a pressure evolution for an alternative track are as follows:

a) At time t=0 along the alternative track, the pressure value p(0) is set equal to the pressure value of the historical storm at time t=0.

b) At time t=1, the pressure value along the alternative track is determined by first determining the percentile of the pressure change along the historical track between times t=0 and t=1. This value is located on the pressure distribution curve for the historical track at location x=1. The percentile is varied by a certain amount, and a pressure change value corresponding to the varied percentile is located in the pressure distribution for location x=1 of the alternative track. The pressure value at time t=1 in the alternative track is then equal to the pressure at time t=0 plus the value located in the alternative track pressure distribution.

c) The above steps are repeated for time t=2, with reference back to the values determined at time t=1.

The percentile is preferably varied according to a uniform distribution. Variance is preferably approximately plus/minus 15%. A second alternative pressure evolution may be created by starting from the last time step and following the same procedure working in reverse to time t=0. A third alternative pressure evolution may be determined by taking a weighted average of the first and second pressure evolutions, giving more weight to the first near the beginning of the track and more weight to the second near the track's end.

It will be appreciated by those of skill in the art that other variations may be similarly determined to produce additional pressure evolutions.

The process of generating alternative pressure evolutions is repeated for each of the historical tracks inputted in the initial step, and for each of the alternative tracks generated from each of the historical tracks. Thus, if there are N alternative tracks generated for each historical track, and if there are M APEs generated for each of the historical and alternative tracks, a total of (N+1)×M "artificial" storms are generated for each historical storm for which data are available. That is, each track (whether it is a historical or an alternative one) is associated with M hypothetical pressure evolutions.

Figure 11:
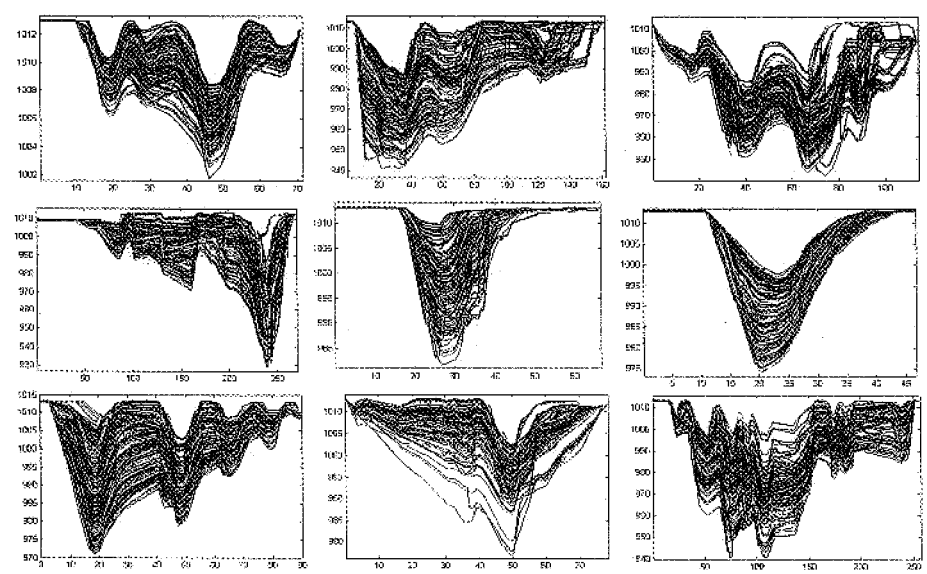
FIG. 11 illustrates a plurality of alternative pressure evolutions for each of a plurality of storms.

FIG. 11 illustrates APEs generated for a plurality of storm tracks. In each of the illustrations of FIG. 11, the pressure evolution of a selected storm track is illustrated by a dark line, while APEs generated for the selected storm track are represented by lighter lines. As previously discussed, the profiles or shapes of the APEs are similar to the selected track. However, the absolute pressure values at any given location along the track differ, as illustrated.

The choice of alternative pressures for each point of the historical pressure evolution is subject to some constraints. For example, the alternative pressure value chosen for a particular point will not exceed pressure values that have never been observed at that particular point, or those that have been determined using the extension of the climatology based on the SST. Furthermore, if in the historical pressure evolution, an unusual pressure variation occurs at a particular location, then similarly unusual variations may be selected for the APEs at that location. Pressure variations which are not possible in nature, or would be extremely unlikely to occur at a given location, are also avoided. The pressure distributions developed in connection with the establishment of the pressure climatology discussed in connection with FIG. 3 are used to facilitate satisfaction of these constraints.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A computer method of generating a probabilistic data set relating to a weather event for use in performing a statistical analysis comprising the steps of:
   a) inputting data representative of an historical track of a weather event, said data including an historical starting point and a plurality of points representative of actual geographical positions along the historical track; and
   b) generating data representative of a plurality of alternative tracks based on said historical track, said data including a starting point and a plurality of alternative points, corresponding to said points representative of said starting point and actual geographical positions along the historical track, representative of geographical positions along said alternative tracks;
   c) wherein said alternative points are generated from said points along the historical track by a dependent sampling process; and
   d) wherein the step of generating data representative of alternative tracks includes the step of limiting a variance of said alternative points from a respective historical point in accordance with one or more physical laws.

2. The method of claim 1, wherein said dependent sampling process is a directed random walk process.

3. The method of claim 1, wherein at least some of the plurality of alternative tracks have starting points that differ from said starting point of the historical track upon which said alternative tracks are based.

4. The method of claim 1, wherein the step of generating data representative of alternate tracks based on said historical track comprises the steps of:
   1) generating a series of random tuples $(x_r, y_r)$ for a historical point $(x,y)$ of the historical track;
   2) calculating a sum of random deviations $(x', y')$ of the random tuples along the historical track; and
   3) adding the sum of random deviations $(x', y')$ to the historical point $(x,y)$ of the historical track to produce alternative points along the alternative tracks.

5. The method of claim 1, wherein the step of inputting data representative of a track of an historical weather event comprises inputting a longitude and a latitude to define each of a plurality of points along said track.

6. The method of claim 1, wherein the step of inputting data includes inputting data representative of a plurality of historic tracks, and wherein the step of generating data includes generating a plurality of alternative tracks for more than one of said plurality of historical tracks.

7. The method of claim 1, wherein the step of inputting data representative of an historical track includes the step of inputting at least one of:
   1) longitude and latitude of a plurality of points representative of the historical track;
   2) an azimuth angle for at least some of the points along the historical track;
   3) celerity for at least some of the points along the historical track;
   4) a rate of change of azimuth angle for at least some of the points along the historical track; and
   5) a rate of change of celerity for at least some of the points along the historical track.

8. The method of claim 1, further comprising the step of selecting a subset of the data representative of the alternative tracks for use in the probabilistic data set.

9. The method of claim 1, wherein the step of inputting data representative of a track of an historical weather event includes inputting data representative of intensity of the event.

10. The method of claim 9, wherein said data representative of intensity comprises atmospheric pressure data associated with at least some of the plurality of points along the historical track, said atmospheric pressure data defining an historical pressure profile of the historical track.

11. The method of claim 10, wherein said atmospheric pressure data includes an absolute pressure (P) and a derivative of absolute pressure with respect to time (dP/dT).

12. The method of claim 10, wherein said atmospheric pressure data includes a pressure distribution.

13. A computer method of generating a probabilistic data set relating to a weather event for use in performing a statistical analysis, comprising the steps of:
   a) inputting data representative of an historical track of a weather event, said data including a plurality of points representative of geographical positions along the historical track; and
   b) generating data representative of a plurality of alternative tracks based on said historical track, said data including a plurality of alternative points representative of geographical positions along said alternative tracks;
c) wherein said alternative points are generated from said points along the historical track by a dependent sampling process; and
d) wherein the step of generating data includes generating a plurality of alternative tracks for more than one of said plurality of historical tracks, and further comprising at least one of the following steps:

1) generating one or more alternative pressure profiles for one or more of the historical tracks;
2) generating one or more pressure profiles for one or more of the alternative tracks; and
3) generating one or more alternative pressure profiles for one or more of the alternative tracks.

* * * * *